United States Patent [19]

Mallas

[11] Patent Number: 4,461,595
[45] Date of Patent: Jul. 24, 1984

[54] WRIST PIN FOR RECIPROCATING ENGINES

[76] Inventor: Angelos Mallas, 17124 Clinton River, Mt. Clemens, Mich. 48044

[21] Appl. No.: 427,050

[22] Filed: Sep. 29, 1982

[51] Int. Cl.³ .................................................. F16J 1/16
[52] U.S. Cl. ...................................... 403/154; 29/525;
29/156.5 A; 138/173; 123/193 P; 123/197 A;
74/579 E
[58] Field of Search ...................... 74/595, 579 E, 599;
403/150, 151, 152, 153, 154; 29/525, 156.5 A;
138/173; 123/193 P, 197 A, 197 AB, 197 AL;
92/187, 210

[56] References Cited

U.S. PATENT DOCUMENTS

| | | | |
|---|---|---|---|
| 1,157,666 | 10/1915 | Bennett | 29/525 |
| 1,330,316 | 2/1920 | Hall | 138/173 |
| 1,859,360 | 5/1932 | Freer | 403/150 |
| 3,053,595 | 9/1962 | Dilworth | 309/19 |
| 3,479,929 | 11/1969 | Fangman | 92/187 |
| 3,702,092 | 11/1972 | Zollner | 92/187 |

FOREIGN PATENT DOCUMENTS

| | | | |
|---|---|---|---|
| 531002 | 1/1922 | France | 138/173 |
| 17633 | of 1893 | United Kingdom | 138/173 |

Primary Examiner—Kenneth Dorner
Assistant Examiner—Anthony W. Raskob, Jr.
Attorney, Agent, or Firm—Harness, Dickey & Pierce

[57] ABSTRACT

A wrist pin for coupling a connecting rod to a piston in an engine is disclosed. The pin takes the form of a metal tube having a specially designed aperture with an increased surface area in comparison with conventional wrist pins having bores with circular cross section. In the preferred embodiment, the internal aperture is defined by alternately connected convex and concave surface portions.

5 Claims, 3 Drawing Figures

U.S. Patent    Jul. 24, 1984    4,461,595
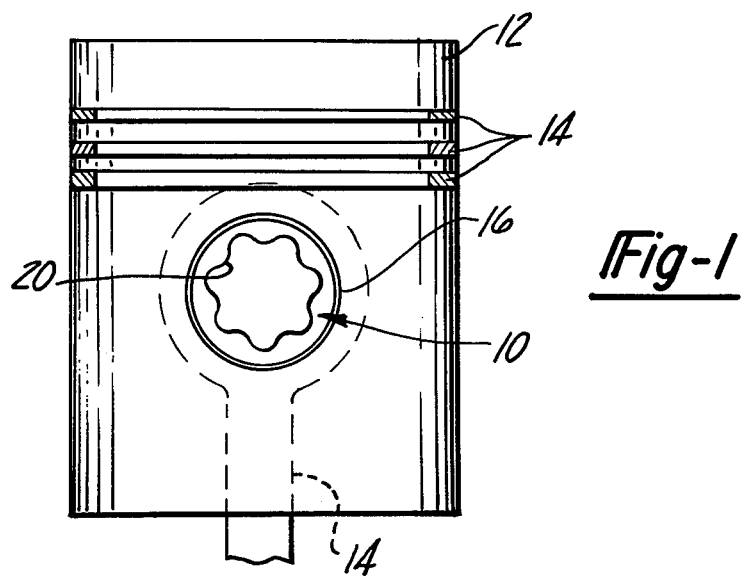
*Fig-1*
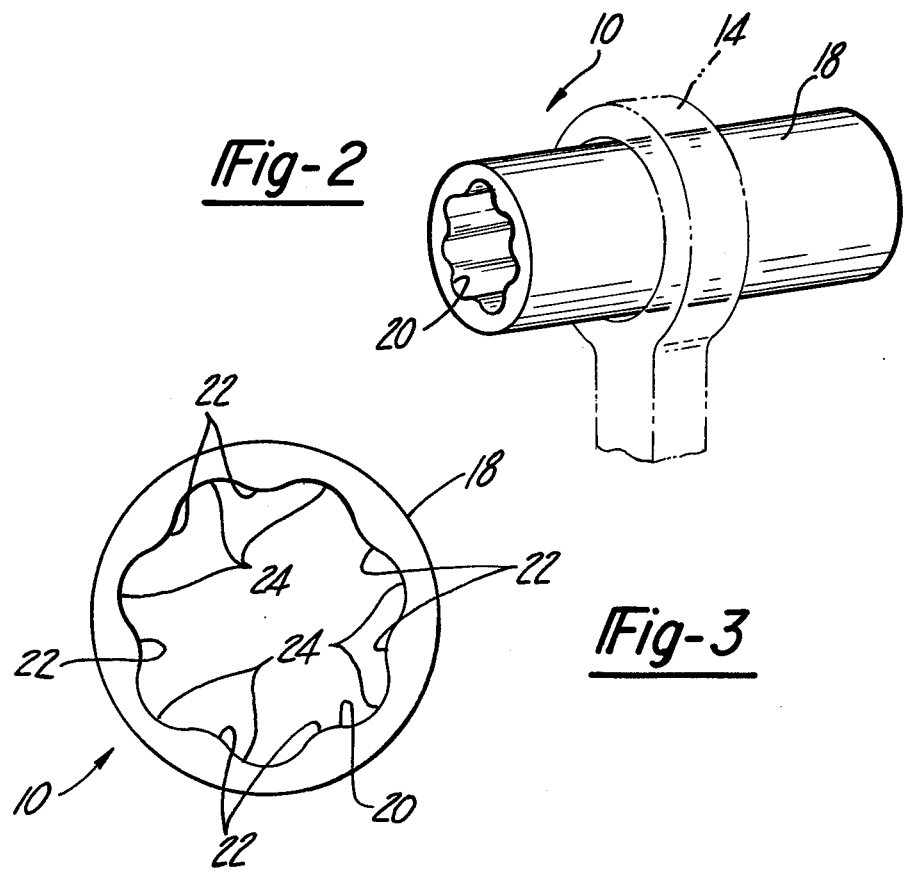
*Fig-2*
*Fig-3*

WRIST PIN FOR RECIPROCATING ENGINES

DESCRIPTION

1. Technical Field

This invention relates to piston assemblies for internal combustion engines and, more particularly, to wrist pins for coupling the piston to a connecting rod.

2. Background Art

Wrist pins, or piston pins as they are sometimes called, are conventionally employed to couple a piston to a connecting rod in an internal combustion engine. One of the most commonly used wrist pin designs is an annular tube having an internal bore with a circular cross section extending throughout its length. The wrist pin is disposed generally horizontally in an opening in the piston often defined by a pair of piston bosses. The vertically depending connecting rod has a transverse opening through which the wrist pin passes. The lower end of the connecting rod is coupled to the crank shaft for converting the reciprocating movement of the piston into rotational movement of the crankshaft for imparting power to the vehicle.

The reciprocating motion of the piston creates a substantial amount of stress on the wrist pin especially during the power stroke. These forces are known to create an appreciable amount of deflection of the wrist pin. In high performance engines the deflection of the wrist pin is especially pronounced and can impair performance of the engine and may, under some circumstances, result in eventual permanent damage to the pin and associated piston assembly.

U.S. Pat. No. 3,702,092 and 3,053,595 are representative of prior art patents disclosing various attempts to increase the strength of the wrist pins. Other designs include the provision of concave surfaces along the exterior length and ends of the pin as shown in U.S. Pat. No. 3,479,929. For various reasons these designs have apparently not met with commercial acceptance. One of the problems with some of these designs is that they unduly increase the weight of the pin in comparison with conventional wrist pins having concentric bores of circular cross-section.

SUMMARY OF THE INVENTION

Pursuant to the present invention, the internal aperture of the wrist pin is defined by an irregular surface having an increased area in comparison with conventional wrist pins having bores of circular cross section. In the preferred embodiment the internal aperture is provided with a scalloped cross section provided by alternately connected concave and convex surface portions resulting in regions of varying wall thicknesses about the perimeter of the tube. The thick wall regions are designed to be located diametrically opposite the thin wall regions.

The wrist pin design of the present invention is expected to exhibit increased strength resisting tendencies to deflect even during the power stroke delivered by high performance engines. These very important advantages are believed to be obtainable while at the same time minimizing the weight of the wrist pin.

BRIEF DESCRIPTION OF THE DRAWINGS

These and other advantages of the present invention will become apparent to one skilled in the art upon reading the following specification and by reference to the drawings in which:

FIG. 1 is a simplified side elevational view illustrating the use of the wrist pin of the present invention in a typical piston assembly;

FIG. 2 is a perspective view of the wrist pin of the preferred embodiment; and

FIG. 3 is an end view of the wrist pin of the preferred embodiment.

DESCRIPTION OF THE PREFERRED EMBODIMENT

In FIG. 1 the wrist pin 10 of the preferred embodiment is shown in connection with a piston assembly including a piston 12 and a connecting rod 14. Piston 12 is mounted for reciprocating motion within a cylinder (not shown) and includes piston rings 14 circumscribing the annular exterior surface of piston 12.

Wrist pin 10 is shown mounted within a transverse opening within piston 12 and secured therein by way of snap rings 16 on its opposite ends. The transverse opening within piston 12 generally conforms with the outer diameter of wrist pin 12 including a pair of lower bosses (not shown) in a manner known in the art. Wrist pin 10 passes through an opening in the upper portion of connecting rod 14 as can be seen most clearly in FIG. 2. It should be understood that wrist pin 10 of this invention may be used in a wide variety of piston assemblies and that this particular example should not be construed in a limiting sense.

Wrist pin 10 takes the form of a tube 18 preferably made of high strength, but light weight, machine steel such as 43-40 or H13. The outer diameter of the tube 18 is circular. The dimension of the outer tube diameter is made to conform with the standard dimensions of conventional wrist pins. Accordingly, the wrist pin of the present invention may be used as replacements for the conventional pins without any modification of the piston assembly.

Special attention should be drawn to the inner aperture 20 of the tube 18. Aperture 20 extends the entire length of tube 18. However, in contrast with conventional bores with circular cross sections, aperture 20 is defined by an irregular surface providing an increased internal surface area in comparison with circular bores. Aperture 20 is scalloped provided by alternately connected convex 22 and concave 24 portions resulting in regions of varying wall thicknesses about the perimeter of the tube. The transitions between the convex 22 and concave 24 portions are smooth and continuous without any jagged edges or abrupt peaks. An important feature of this invention is that the thicker wall regions provided by each convex portion 22 are located diametrically opposite the thinner wall regions provided by concave portions 24. In this embodiment there are seven convex portions 22 and seven concave portions 24.

By way of a nonlimiting example, the outside diameter of tube 18 is about 0.927 inch. The radiuses of the convex 22 and concave portions 24 are about 0.135 inch. The innermost diameter defined by the tops of convex portions 22 is 0.656 inch whereas the outer most aperture diameter defined by the valleys of concave portions 24 is about 0.750 inch.

It can be appreciated that the scalloped aperture design of the wrist pin of the present invention provides an increased surface area in comparison with circular bores of either 0.656 inch (providing a wall thickness of 0.136 inch) or 0.750 inch (providing a wall thickness of 0.114 inch). The scalloped aperture design is lighter in weight than the conventional pin design having the continuous thicker wall. The lighter reciprocating weight provides significant advantages such as lower bearing loads, reducing connecting rod stretch minimizing friction and providing smaller bob weights. As a result increased horsepower from the engine may be achieved. These and other advantages are expected to be achieved while at the same time increasing the strength of the pin thereby reducing deflection during operation of the engine.

Other advantages of the present invention will become apparent to one skilled in the art upon reading the specification, drawings and following claims.

I claim:

1. In an assembly for use in a reciprocating engine, the improvement comprising:
 a piston;
 a connecting rod having an upper portion with an opening extending therethrough; and
 a wrist pin passing through the opening in the connecting rod and coupled to the piston, said wrist pin being defined by a tube having an outer surface dimensioned to as to substantially correspond in size to the opening in the connecting rod, said tube including a single, generally concentric, inner aperture extending throughout the longitudinal length of the tube, said aperture having an irregularly shaped cross-section defined by alternately connected convex and concave portions.

2. The improvement of claim 1 wherein there are an equal number of convex and concave portions, with said convex portions being located diametrically opposite said concave portions.

3. In an assembly for a reciprocating engine, the improvement comprising:
 a piston;
 a connecting rod having an upper portion with an opening therein, and
 a wrist pin passing through the opening in the connecting rod and having ends thereof coupled to spaced locations, said wrist pin being defined by an integral metal tube having an outer surface with a diameter essentially the same size as the opening in the connecting rod, said tube including a single, concentric inner aperture extending longitudinally throughout the length of the tube, said aperture having an irregular-shaped cross-section defined by an equal number of alternately connected convex and concave portions having smooth transitions therebetween, said convex portions being located within the tube so that they are diametrically opposite said concave portions thereby providing wall regions of varying thicknesses, with thicker wall regions opposing thinner wall regions.

4. The improvement of claim 3 where the ends of the tube are connected to the piston by snap-rings.

5. The improvement of claim 3 wherein there are seven convex portions and seven concave portions.

* * * * *